Figure 16:
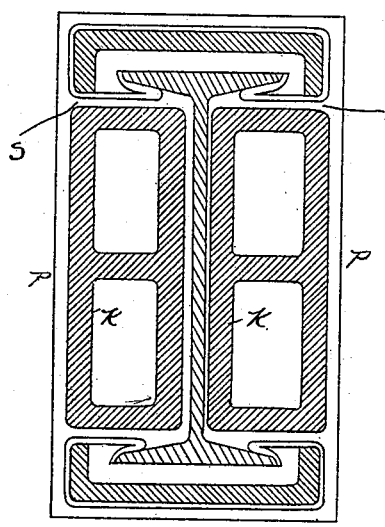

No. 646,192. Patented Mar. 27, 1900.
C. T. PURDY.
BEAM COVERING.
(Application filed Sept. 10, 1898.)
(No Model.) 4 Sheets—Sheet 1.
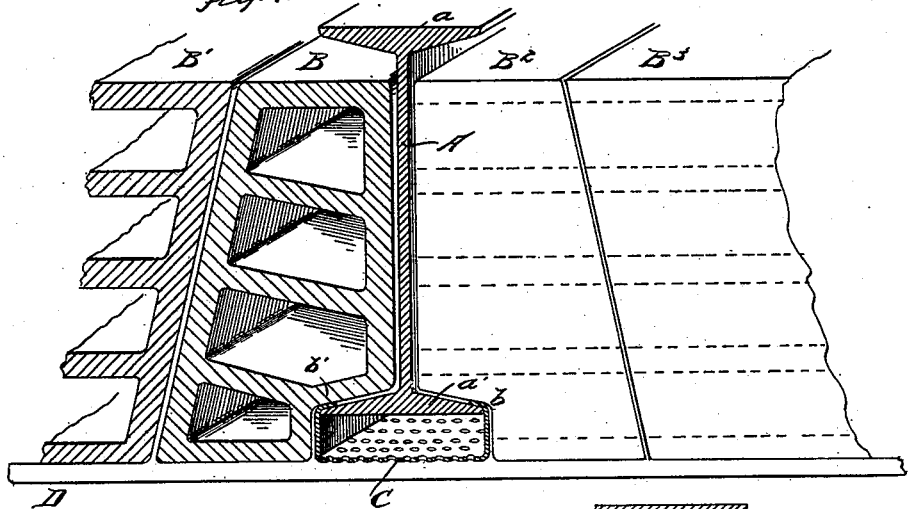
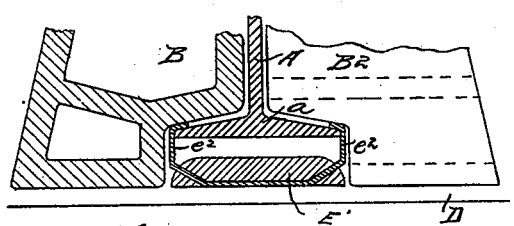
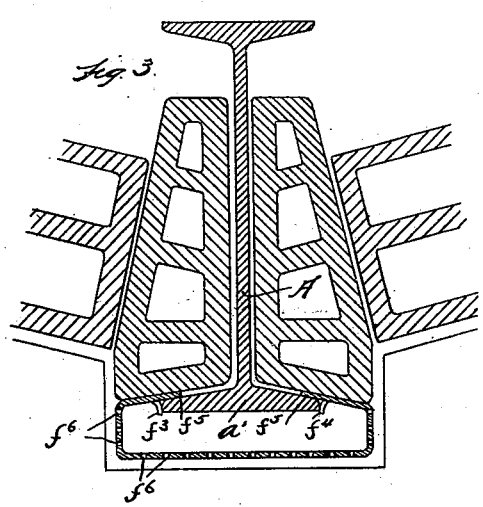
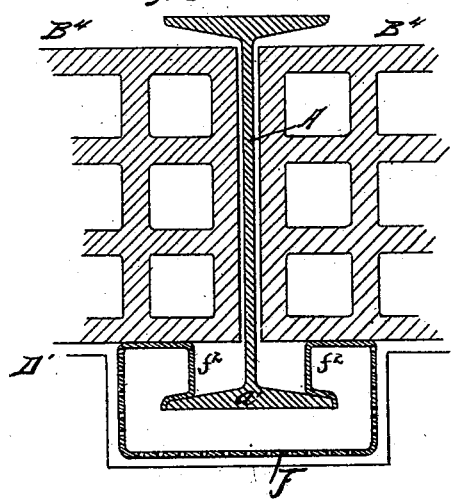
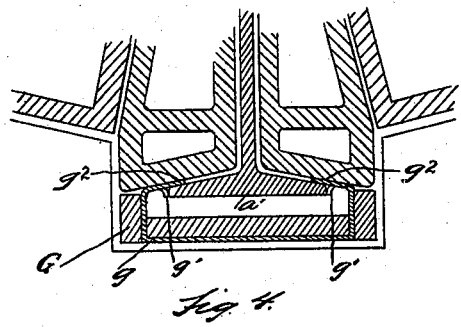
WITNESSES
INVENTOR
Corydon T. Purdy
By Parker & Burton
Attorneys.

No. 646,192. Patented Mar. 27, 1900.
C. T. PURDY.
BEAM COVERING.
(Application filed Sept. 10, 1898.)
(No Model.) 4 Sheets—Sheet 2.
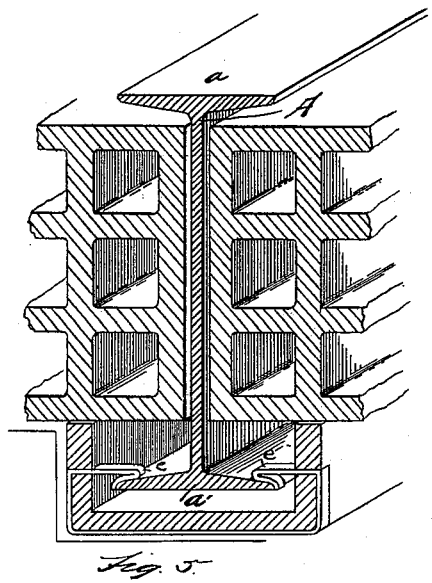
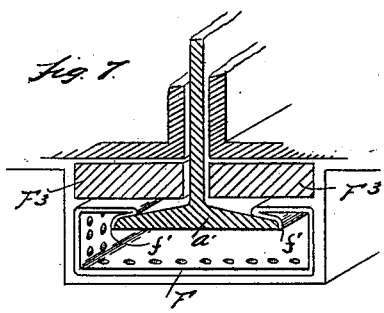
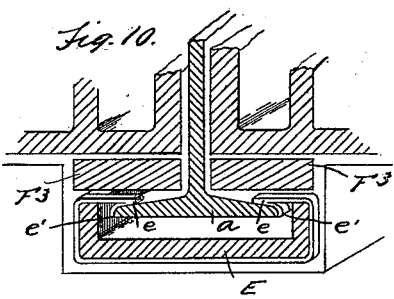
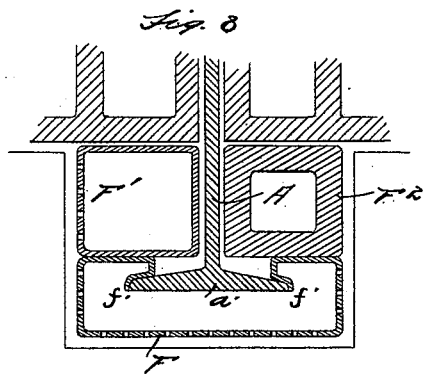
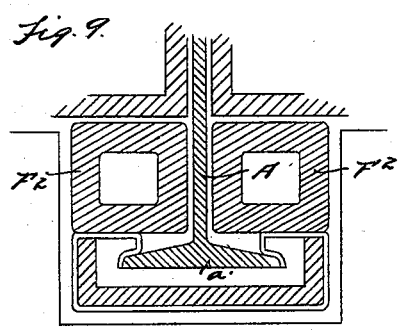
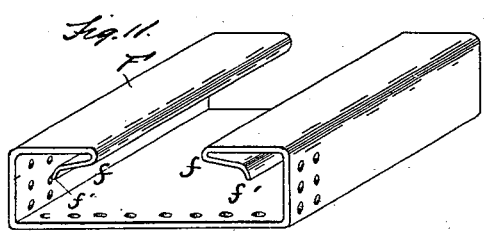
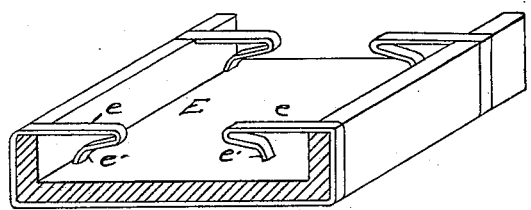
WITNESSES
Chas. Wiener
Virginia M. Clough.
INVENTOR
Corydon T. Purdy
By Parker & Burton
Attorneys.
THE NORRIS PETERS CO., PHOTO-LITHO., WASHINGTON, D. C.

No. 646,192. Patented Mar. 27, 1900.
C. T. PURDY.
BEAM COVERING.
(Application filed Sept. 10, 1898.)
(No Model.) 4 Sheets—Sheet 3.

WITNESSES
Chas. Wiener
Virginia M. Clough

INVENTOR
Corydon T. Purdy
By Parker & Burton
Attorneys.

THE NORRIS PETERS CO., PHOTO-LITHO., WASHINGTON, D. C.

No. 646,192. Patented Mar. 27, 1900.
C. T. PURDY.
BEAM COVERING.
(Application filed Sept. 10, 1898.)
(No Model.) 4 Sheets—Sheet 4.
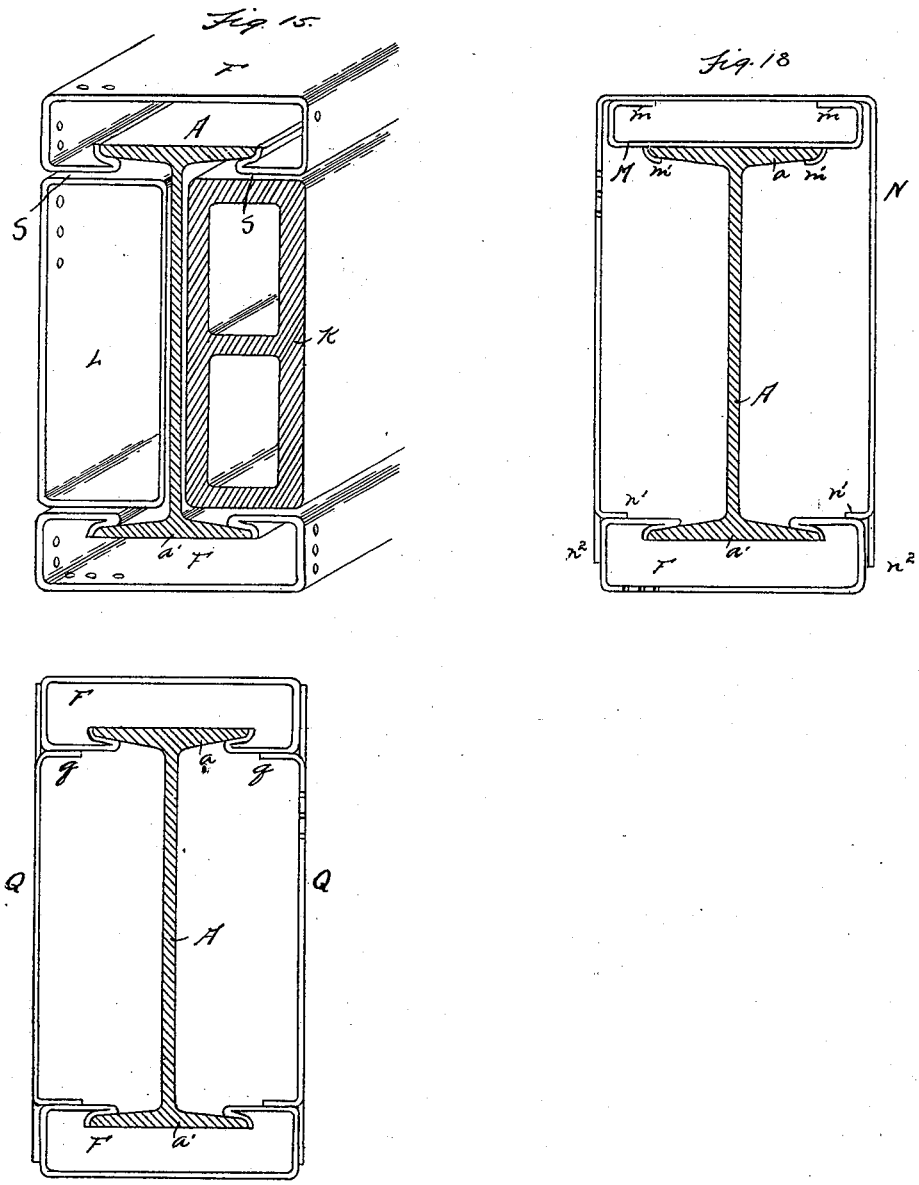

UNITED STATES PATENT OFFICE.

CORYDON T. PURDY, OF NEW YORK, N. Y.

BEAM-COVERING.

SPECIFICATION forming part of Letters Patent No. 646,192, dated March 27, 1900.

Application filed September 10, 1898. Serial No. 690,636. (No model.)

*To all whom it may concern:*

Be it known that I, CORYDON T. PURDY, a citizen of the United States, residing at New York, county of New York, State of New York, have invented certain new and useful Improvements in Beam-Coverings; and I declare the following to be a full, clear, and exact description of the invention, such as will enable others skilled in the art to which it pertains to make and use the same, reference being had to the accompanying drawings, which form a part of this specification.

My invention relates to fireproof construction in buildings; and it consists in peculiar combinations hereinafter described and claimed. In structures of this character the ordinary construction of floors and partitions quite generally leaves some of the beams wholly or partially uncovered, and the means commonly employed to inclose such exposed beams or parts of beams is unsatisfactory. In many cases the erection is done in such a way that exceptional care must be exercised to secure good work. Much of it is exceedingly imperfect at best, much of it also is unscientific, and, worst of all, it has finally proved to be insufficient in protection from fire when other portions of the fireproofing material in the same structure have proved satisfactory.

The particular object of my invention is to overcome all of these objections and to provide a method of covering these so-called "exposed" beams and parts of beams which can be relied on to perfectly protect them from fire under the most extraordinary circumstances. As the exposed beams and parts of beams occur in many ways, it follows necessarily that there are very many forms in which the principles of my invention can be employed, and in the drawings I have illustrated a number of them.

In the drawings, Figure 1 is a view in section of a beam supporting blocks of terra-cotta fireproofing on the lower flange, the lower face of the flange raised above the level of the ceiling and protected in the manner hereinafter described. Fig. 2 is a sectional view showing a variation of Fig. 1. Fig. 3 is a sectional view of a beam supporting blocks of terra-cotta fireproofing on the lower flange, the lower face of the flange projecting below the ceiling and protected in the manner hereinafter described. Fig. 4 is a sectional view showing a variation of Fig. 3. Fig. 5 is a view, partly in section and partly in perspective, of a girder-beam projecting below the blocks of terra-cotta fireproofing and protected as hereinafter described. Figs. 6, 7, 8, 9, and 10 are sectional views showing variations of Fig. 5. Figs. 11, 12, 13, 14, and 22 are detail figures in perspective, showing more clearly the particular forms of material employed in my invention. Figs. 16, 17, 18, and 19 are sectional views showing variations of Fig. 15.

Figure 14:
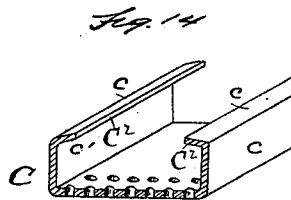
Figure 13:
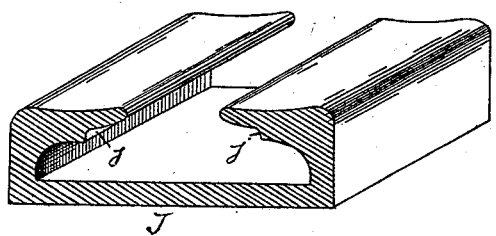
Figure 20:
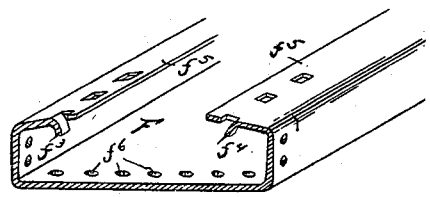

In Fig. 1 I have shown an ordinary I-beam A, having top and bottom flanges $a$ $a'$ of the ordinary form and used as a supporting-beam for a floor and ceiling composed of fireproof blocks arranged in the usual manner in relation to such beam. The blocks B B' are shown arranged in one way, and the blocks $B^2$ $B^3$ are shown arranged in another way, both of which are in common use. These blocks, regardless of their arrangement, have rabbets $b$ $b'$ cut in their lower corners, forming reëntering angles, one of the faces being adapted to rest upon the flange $a'$ and the other extending below it, so that the arrangement of blocks forms an open place or channel in the ceiling, which is wider than the bottom of the beam and which must be treated in such a way that the lower face of the beam will be protected from the action of heat. I have shown in Fig. 14 one means by which this result is obtained. It consists of a foraminous sheet of metal forming a shield and shaped as shown in Fig. 14. The lower face is suitably perforated, so that the plaster will hold firmly to the ceiling in the manner hereinafter described. The sides of this sheet $c'$ $c'$ are bent upward and inward, and the edges $c$ $c$ are bent still more inwardly, forming lips, while the points $c^2$ $c^2$ form shoulders. The edges of these lips, together with the shoulders $c^2$ $c^2$, are adapted to exactly fit the edges of the flange of the beam when the shield is in position, resting against both the top and the outside of the edges of the flange of the beam. It is obvious that the distance between the opposite shoulders $c^2$ $c^2$ must be the same as the width of the flange of the beam which it covers. It is also obvious that the distance from the edge of the lip $c$ to the farthest opposite inside corner of the shield must be greater than the width of the flange of the beam and that otherwise the depth of the shield, the width of the shield, and the width of the lips $c$ $c$ may vary to suit the convenience of the construction, while the shield may also be of any convenient length.

Before the blocks B B² of terra-cotta are put in place on the beam, as in Fig. 1, the shield C is put in place on the lower flange $a'$ of the beam A. By tipping the shield, so that one flange of the beam enters the channel at first, it can be adjusted to its exact position without bending any part of it or changing its form whatsoever in the operation of placing it. When it is properly adjusted, it is obvious that the lips $c$ $c$ not only support it on the flange of the beam, but the shoulders $c^2$ $c^2$ also prevent it from moving sidewise. It is also obvious that when the blocks B B² of terra-cotta are put in place they lock the shield C firmly in position. The sides of the shield at $c'$ are preferably made so that the lower face of the shield C shall be substantially in the plane of the lower face of the blocks B B², although if the shield should not quite come out to the lower surface of the blocks it would not be material. After the assemblage of the beam, the shield, and blocks is completed the under surface may be covered in the usual manner by a layer of plaster, (shown at D,) which layer is held to the shield C by means of perforations, enabling it to clench and form a continuous uniform ceiling. It is obvious that the lower flange of the beam is protected by the shield and the plaster attached to it, over which is an air-space between it and the beam, and, further, that even if cracks occur—say along the line of the junction of the shield and the blocks—the plaster clenched to the shield could not readily be removed, and thus the integrity of the protection would not be impaired. The depth of the shield may, however, be made less than the depth of the groove, of which the beam is the top, and before the finishing coat of plaster is put on the space thus left could be filled with any plastic material flush with the plane of the lower portion of the blocks, and this plastic material, adhering to the shield, as hereinbefore described, would form a surface similar in character to that of the bottom of the blocks B and B², upon which the regular plaster can be placed. It is also obvious that this shield might be made of woven wire or of an unperforated plate of metal having corrugations on its under surface to which plaster can adhere or, indeed, of any other material having a surface to which plaster can adhere firmly. It is obvious that its essential features consist, first, in its form by which it can be placed upon the flange of the beam without having to be bent or manipulated at the time and by the workmen who put it in place; second, in its form by which when it is put in place it is supported by the flange $a'$ of the beam without the employment of any other fastening members, such as nails or hooks or wires or clips or other agents; third, in its form by which it cannot move upon the flange either to one side or to the other when it is once put in place, for it is obvious that if the distance between the shoulders $c^2$ $c^2$ is exactly the same as the width of the flange it cannot possibly be moved without it is first lifted, and, fourth, in its being so fashioned that the blocks B and B² lock it in place, so that it cannot be lifted and moved, even so perfectly secured that if the filling material in the floors were badly broken in a fire it would be impossible to move the shield from its fixed position until blocks B B² were completely removed.

In Fig. 2 I have shown the shield constructed in a different manner, but having the same essential features, operated upon substantially the same principles, and to be used under the same conditions. The bottom part of this shield consists of a slab of incombustible material carried by inflexible metal bands $e^2$ $e^2$, which may be embedded in said slab, as shown in Fig. 4, or which may be rigidly combined with it by clasping it on the outside, as shown in Fig. 12. In either case the essential principle remains the same. The ends of the bands are turned upward and inward, so as to form lips in exactly the same way as the lips $c$ $c$ of the foraminous shield C of Fig. 14 are formed, the bands being inflexible and rigid in their connection to the slab of incombustible material. It is also obvious that this modified form of the shield must be put in place in the same way as the shield C shown in Fig. 1 and hereinbefore described.

Figs. 3, 4, 5, 6, 7, 8, 9, and 10 show another modification of my invention in combination with a floor construction, in all of which the ceiling-line is raised above the bottom of the beams. Figs. 11, 12, and 22 show the same shields separately, partly in section and partly in perspective. The essential features of the shield in all of these figures are the same as those of the shield shown in Fig. 14; but the construction is modified slightly to meet the changed conditions. These modifications are as follows:

In Fig. 11 I have shown a shield consisting of a foraminous metal plate turned up at the sides at right angles to the bottom of the shield, the lip also being turned inward at right angles to the sides and parallel with the bottom and the edges at $f$ $f$ turned in upon itself with its extreme edges bent slightly downward at $'f'$ $f'$. The surface at the top (shown parallel with the bottom) affords a square seat for the filling material required on each side of the beam to cover the beam between the shield and the ceiling-line. The surface of the lip between $f$ and $f'$ is fashioned so as to bear directly on the flange of the beam both on top and on the outside edges. It is obvious that the extreme edges $f$ $f$, bent down, form the shoulder of the shield and that the distance between $f$ and $f'$ must be equal to the width of the flange which the shield is intended to cover. It is also obvious that when the shield is used as shown in Figs. 6, 7, and 8 it can be placed in position without having to be bent or manipulated at the time by the workmen who put it in place, that it will also be supported by the flange $a'$ of the beam without the employment of any other fastening members, and that it also cannot move upon the flange either to one side or to the other when it is once put in place. In Fig. 6 it is also obvious that when the fireproof blocks $B^4$ $B^4$ are put in place the channeled shield F is locked in position. Also in Figs. 7 and 8 it is obvious that when the blocks marked $f'$, $f^2$, and $f^3$ are put in their place the shield F will be likewise locked securely in place and that it will be impossible to move the shield in its place on the beam or take it off from the beam without first removing the fireproof blocks between it and the ceiling-line.

Fig. 12 is a modification of the shield shown in Fig. 11. The shield shown in this figure consists of a channeled slab of incombustible material combined with metal bands $e$, which are turned back upon themselves and downward to fit the top and outside edges of the bottom flange of the beam, exactly the same as do the edges of the shield shown in Fig. 11. It is obvious that the metal bands must be inflexible and that they must be rigidly connected to the channel-slab of incombustible material, either by being embedded or by clasping around the channel-slab, as shown in Fig. 12. It is also obvious that it may be used the same as the shield shown in Fig. 11 and that all of its essential features are exactly the same. It is shown in combination with the beam in Fig. 10 and in a somewhat-varied form in Fig. 5.

In Fig. 22 I have shown a form of shield made of foraminous metal, with the shoulders $f^3$ $f^4$ formed in exactly the same way as they are formed in the shield shown in Fig. 14. It differs only from that shown in Fig. 14 in having the sides at right angles to the bottom of the shield. It is shown in combination with the beam and the fireproof blocks in Fig. 3. It is obvious that this variation also has the same essential features as those described for the shield shown in Fig. 14 and that it must be used in exactly the same way as those shown in Figs. 5 and 6.

Fig. 4 shows a variation of the shield in combination with the beam and fireproof blocks similar to that shown in Fig. 2, but modified so as to conform to the conditions of that shown in Fig. 3.

In Fig. 8 the members of filling material protecting the web of the beam between the shield and the ceiling-line are shown in two alternative forms, one made of foraminous metal and the other of hollow incombustible material, commonly burnt-clay material. In Fig. 7 the similar block $f^3$ is shown solid. It is obvious that it is immaterial to my invention whether these blocks are hollow or solid or whether they are made of one material or another. It is also obvious that the exact width of the shield and its exact depth below the bottom of the flange of the beam are immaterial to my invention. It is also obvious that the shield may be made not only of foraminous metal, as shown in Figs. 11 and 12, or of a channel-slab rigidly combined with inflexible bars, as shown in Fig. 12, but that it may be made of any other material having sufficient strength for the purpose and a surface to which plaster will adhere, as shown in Figs. 7, 8, 9, and 10. It is also obvious that the essential feature of the shield, which makes the placing of it upon the beam without any change of form a possibility, makes it necessary that the bottom and sides of the flange of the beam must always be surrounded by an air-space, which will serve to protect the beam from the effects of a fire. It is also obvious that the character of the filling material used between the beams for the construction of the floor and the ceiling is immaterial to my invention and that, while the figures showing combinations are drawn with blocks of material in the form of arches, &c., my invention is equally applicable to constructions in which the floors and ceilings are made of other material.

Figure 17:
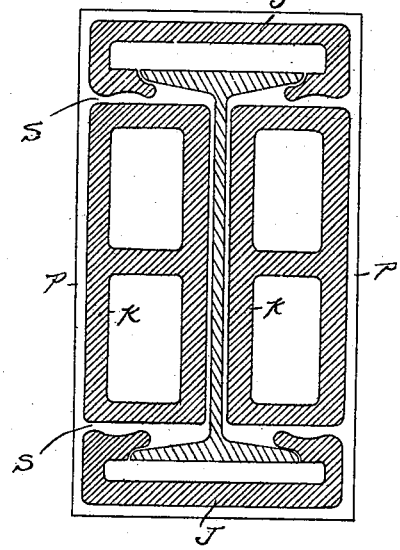

In Figs. 15, 16, 17, 18, and 19 I have shown the protection of the beam where it is entirely separate from any floor or partition. Preliminarily, however, I will describe a block made of incombustible materials, as shown in perspective in Fig. 13. It will be noted that it has the outline, so far as the inturned lips are concerned, shown in Fig. 11, and that like the shield shown in Fig. 11 it can be attached to the bottom flanges of a beam, as shown in Fig. 17. In such position the undercut recesses $j$ $j$ fit the edges of the flange, as shown in section in Fig. 17, thereby preventing lateral displacement, and when the blocks K K, also made of incombustible material, are put in position, as shown, the slabs J are held in place on the flanges of the beam and cannot be displaced.

In Fig. 16 I have substituted for the blocks J the form of protecting-shield or block shown in Fig. 12, the blocks K K remaining the same.

In Fig. 15 I have shown a block K upon one side of the web and a foraminous metal shield L upon the opposite side for the purpose of showing equivalent constructions. The foraminous metal shield L resembles in structure that of F' in Fig. 8, whereas the block K resembles that of $F^2$ in the same figure, except that they are differently proportioned. On the top and bottom flanges are attached foraminous shields F F, as shown in Fig. 11. It is obvious that the foraminous shield L is the exact equivalent of the block K and that they are interchangeable in the sense that either may be used, if desired, and it is also obvious that the shield, as shown in Fig. 12, may be also used interchangeably with the shield shown in Fig. 11. In all of these cases, as shown by Figs. 15, 16, and 17, the spaces S S around the blocks L and K are filled with mortar (not shown) when the blocks are put in place.

In Fig. 18 upon the bottom flange of the beam A, I attach a foraminous shield constructed like that of Fig. 11. Upon the top flange I have shown metal bars M, with upturned and inturned edges $m$ $m$ and with clips $m'$ $m'$, punched out of its surface and extending far enough to grasp the edges of the top flange of the beam. Over this I place a foraminous metal casing N, the lower edge of which is adapted to grasp the lower foraminous shield already described and hold it in place by the inturned clips $n'$ $n'$, cut out of its edges $n^2$ $n^2$. The bars M may be any desired width and must be spaced at convenient and suitable intervals. This structure may also be covered by plastering, and so protect the inclosed beam.

In Fig. 19 I have shown another modification, in which I employ the shields F F for the upper and lower flanges like that of Fig. 11 and then place on each side foraminous plates Q, with clips $q$ $q$ pressed out of their surfaces and at right angles thereto and extending inwardly at proper distances apart, so as to support and retain the shields F F in place on the flanges.

It is obvious that very many forms of my invention might be employed.

It will be observed that the constructions above described have supporting edges or portions which are fixed relative to the body of the shield and which rest on the outer edge portions of the flange, as distinguished from structures wherein clips, nails, or other separate securing means are employed and also from forms wherein the edges are bent down to clasp the flange after the shield is adjusted.

What I claim is—

1. As a new article of manufacture, a channeled shield for the protection of flanges of beams from fire, having a width on the channeled side greater than that of the flange of the beam which it is designed to cover, and having edges turned inward, on both sides alike and carrying lugs or shoulders projecting internally therefrom and near the edges, the two lugs or shoulders being separated by a distance equal to the width of the flange of the beam, substantially as described.

2. The combination of a channeled shield for the protection of the flanges of beams, so shaped that it can be hooked over the flange and put in place without its form being changed in the operation, the beam to which the same is attached, and filling material adjacent thereto arranged to securely lock the shield in place without requiring the employment of other fastening elements, substantially as described.

3. The combination of a metal beam; filling material adjacent thereto; and a channeled shield, fashioned before use to an exact and unchangeable form, engaging and covering a portion of the beam, inclosing an open air-space, and locked fast in place by the filling material without other fastening elements; substantially as described.

4. The combination of a metal beam; a filling material adjacent thereto, forming a ceiling, protecting material under the ceiling and adjacent to the web of the beam, and a channeled shield, fashioned before use to an exact and unchangeable form and adapted to engage and cover the bottom flange of a beam, inclosing an open air-space on both edges and under the flange, and locked fast in place by the protecting material adjacent to the web of the beam without other fastening elements; substantially as described.

5. The combination of a metal beam, protecting material on each side of the web thereof, and two channeled shields, each of which is fashioned before use to an exact and unchangeable form, each engaging and covering a flange of the beam inclosing open air-spaces on both edges and outside of the flanges of the beam, and locked fast in place by the protecting material adjacent to each side of the web of the beam, substantially as described.

6. A new article of manufacture consisting of the combination of a piece of incombustible material properly shaped, and inflexible angular metal parts fixed thereto, the whole shaped to an exact form before use, and adapted to protect ironwork in buildings from fire, substantially as described.

7. The combination with a flanged metal supporting member, of a protecting-shield therefor located relative to the flange to form an intervening air-space and having relatively-fixed securing and supporting edges bent inward, and arranged to rest on the outer edges of the flange.

8. As a new article of manufacture, a channeled shield for the protection of flanges of beams from fire, embracing the flange of the beam which it is designed to cover, and having edges turned inward, on both sides and carrying abutting lugs or shoulders projecting internally therefrom, substantially as described.

9. The combination with a flanged supporting member, of a protecting-shield therefor, having sides with inturned securing portions, overhanging the edges of the flange the distance between the securing portion on one side and the diagonal opposite point of the interior of the shield being greater than the width of the flange, substantially as described.

10. As a new article of manufacture, a channeled shield for the protection of flanges of beams from fire, having a width on the channeled side greater than that of the flange of the beam which it is designed to cover, and having edges turned inward, on both sides alike, and carrying shoulders, near the edges, the said shoulders being separated by a distance equal to the width of the flange of the beam, substantially as described.

11. As a new article of manufacture, a channeled shield for the protection of the flanges of beams from fire, constructed with edges turned inward to embrace the flange of the beam which it is designed to cover, and having abutting shoulders separated by a distance equal to the width of the flange of the beam, substantially as described.

In testimony whereof I sign this specification in the presence of two witnesses.

CORYDON T. PURDY.

Witnesses:
R. A. PARKER,
MARION A. REEVE.